US006213540B1

(12) United States Patent
Tusim et al.

(10) Patent No.: US 6,213,540 B1
(45) Date of Patent: Apr. 10, 2001

(54) ENERGY ABSORBING ARTICLES OF EXTRUDED THERMOPLASTIC FOAMS

(75) Inventors: Martin H. Tusim, Midland, MI (US);
Martin C. Cornell, Lake Jackson, TX (US); Kyung W. Suh, Midland; Christopher P. Christenson, Beaverton, both of MI (US); Chung P. Park, Baden-Baden (DE)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/105,619

(22) Filed: Jun. 26, 1998

Related U.S. Application Data

(60) Provisional application No. 60/051,155, filed on Jun. 27, 1997, and provisional application No. 60/053,343, filed on Jul. 22, 1997.

(51) Int. Cl.[7] .......................... B60K 37/00; B60R 19/22; F16F 7/12
(52) U.S. Cl. ......................... 296/189; 188/376; 188/377; 293/109; 428/213; 428/218; 428/317.9; 428/318.8; 428/910
(58) Field of Search .................................. 428/212, 218, 428/304.4, 317.9, 318.8, 910, 213; 293/102, 109; 180/232; 280/751, 784; 188/371, 377, 376; 296/189, 35.2

(56) References Cited

U.S. PATENT DOCUMENTS

| | | | |
|---|---|---|---|
| 3,573,152 | * 3/1971 | Wiley et al. | 428/212 X |
| 3,702,711 | * 11/1972 | Beckley | 428/218 X |
| 3,816,234 | * 6/1974 | Winfield | 428/317.9 |
| 3,881,697 | * 5/1975 | Glaesener . | |
| 4,352,484 | * 10/1982 | Gertz et al. | 293/133 X |
| 4,505,960 | * 3/1985 | Leffingewell | 428/218 X |
| 4,824,720 | * 4/1989 | Malone | 428/294 |
| 4,966,805 | * 10/1990 | Ezawa et al. | 428/212 |
| 5,180,628 | * 1/1993 | Haardt et al. | 428/317.9 X |
| 5,300,361 | * 4/1994 | Vowinkel et al. | 428/304.4 |
| 5,340,840 | * 8/1994 | Park et al. | 521/60 |
| 5,352,500 | * 10/1994 | Memon | 428/35.7 |

FOREIGN PATENT DOCUMENTS

| | | | |
|---|---|---|---|
| 1174772 | * 12/1969 | (GB) | 428/910 |
| 0 195 758 | * 12/1982 | (JO) | 293/102 |

* cited by examiner

Primary Examiner—Richard D. Lovering

(57) ABSTRACT

An energy absorbing article having a direction in which impact resistance is desired is formed of extruded thermoplastic foam exhibit anisotropic compressive strength. The extrusion direction of the thermoplastic foam is aligned substantially parallel with the direction in which impact resistance is desired to provide an energy absorbing article exhibiting a high ratio of compressive strength to weight.

35 Claims, 4 Drawing Sheets

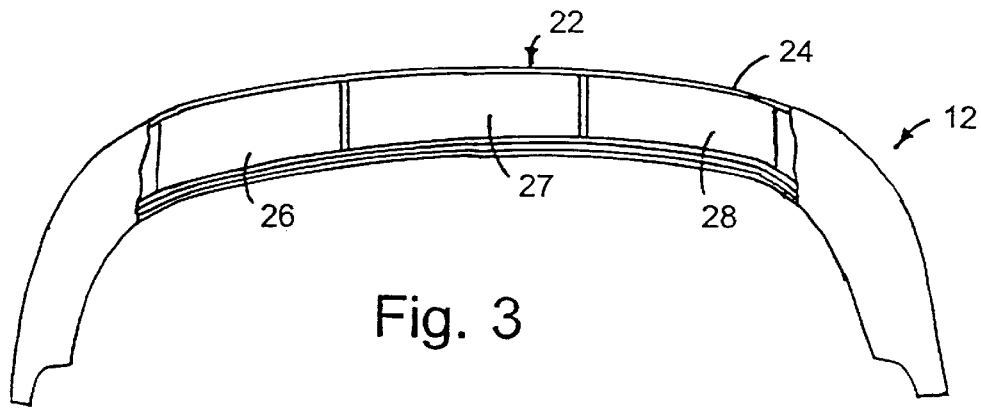
Fig. 3
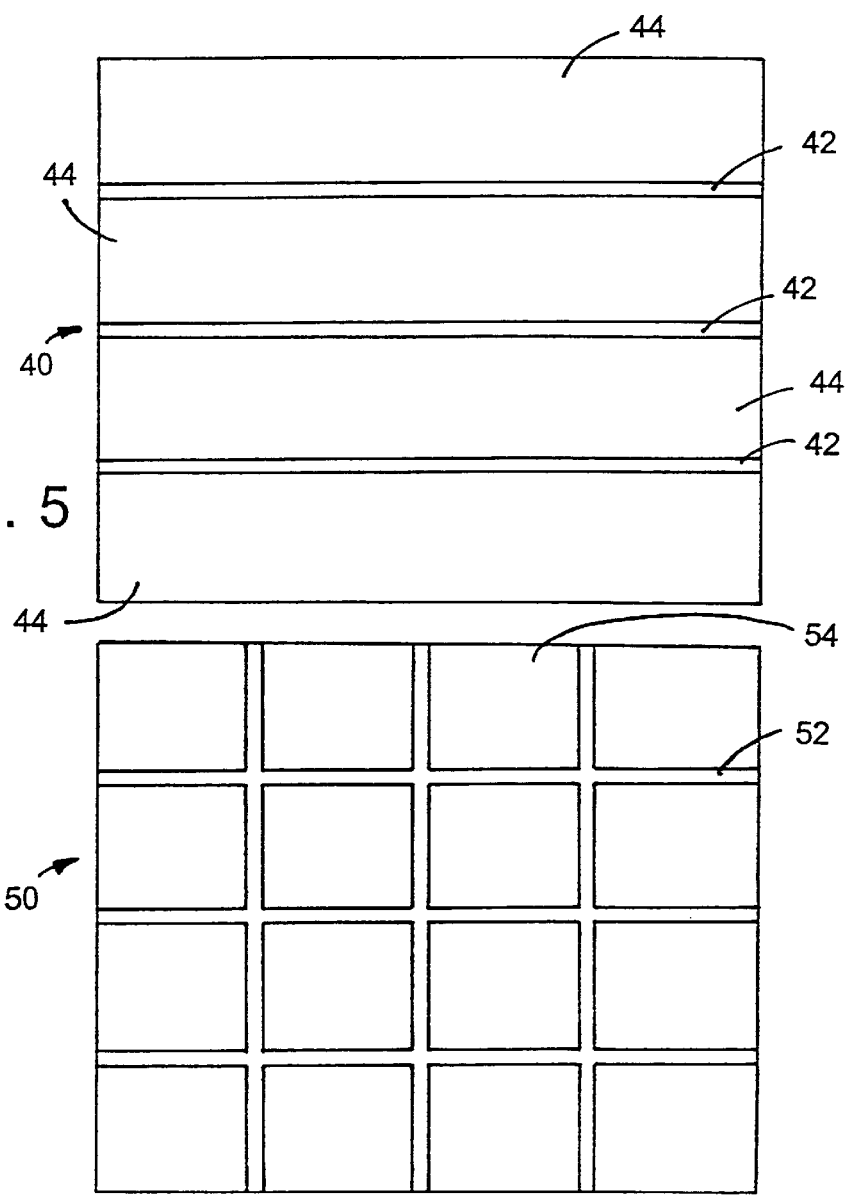
Fig. 5
Fig. 6

ENERGY ABSORBING ARTICLES OF EXTRUDED THERMOPLASTIC FOAMS

This application claims the benefit of U.S. Provisional Application No.60/051,155 filed Jun. 27, 1997 and U.S. Provisional Application No. 60/053,343 filed Jul. 22, 1997.

FIELD OF THE INVENTION

This invention relates to articles formed of thermoplastic foams, and in particular to energy or impact absorbing articles, such as automobile energy absorbing units, made of thermoplastic foams.

BACKGROUND OF THE INVENTION

In recent years, light weight plastic automobile energy absorbing units (EAUs) have been employed in conjunction with conventional metal automobile bumpers to absorb low energy (lower speed) impacts. The plastic automobile EAUs are usually employed in front of the bumpers. Plastic automobile EAUs are usually composed of a core material of a plastic foam and a surface material of a synthetic resin enclosing the foam core and are usually mounted on a rigid cross beam. Plastic materials which have been proposed for the foam core material include polyurethane, polyethylene bead, polystyrene and polypropylene bead foams. The foam core material is an important component part which affects the performance of an automobile EAU, and is generally required to have excellent energy absorbing properties and dimensional recovery. Further, to decrease the weight of an automobile, the EAU core material should be of low density.

Polyurethane foam EAU cores have excellent energy absorbing properties and dimensional recovery, but have relatively high density. As a result, the polyurethane foam EAU cores are relatively heavy and expensive. Polystyrene foam has relatively poor dimensional recovery and impact strength. Accordingly, automobile EAU cores made of foamed beads of an olefinic polymer, especially a polypropylene-type resin, are most common.

A conventional automobile EAU core of foamed olefinic polymer is prepared by feeding expandable beads of a polypropylene-type resin in a mold capable of enclosing the particles but allowing escape of gases therefrom, and heating the expandable beads at a temperature at which the beads expand and soften and melt-adhere to each other into a mass, whereby a foamed molded article expanded to the same shape and size as the cavity of the mold is formed. An automobile EAU core prepared from beads of a polypropylene-type resin foam requires a foam density of about 12.5 pounds per cubic foot to achieve a compressive strength of about 250 pounds per square inch at 25% strain. Automobile EAU cores having comparable compressive strength at a lower density would be desirable.

SUMMARY OF THE INVENTION

According to the present invention, there is provided an energy absorbing article formed of an extruded thermoplastic foam which exhibits anisotropic strength properties, and a method of absorbing impact using an extruded thermoplastic foam which exhibits anisotropic strength properties. The extruded thermoplastic foam can be utilized in energy absorbing articles in which the high strength direction of the foam is generally aligned with the direction at which impact with the energy absorbing article is anticipated.

BRIEF DESCRIPTION OF THE DRAWINGS

FIG. 3 is a top plan view of the rear EAU of the automobile shown in FIG. 1, with portions broken away to reveal thermoplastic foam extrudates contained within the EAU;

FIG. 5 is a transverse cross section of a thermoplastic foam composite comprising alternating relatively thin, relatively high density non-foamed layers and relatively thick, relatively low density foamed layers;

FIG. 6 is a transverse cross section of a thermoplastic foam composite having a network of relatively thin, relatively high density intersecting film layers defining spaces occupied by relatively low density thermoplastic foam;

DESCRIPTION OF THE PREFERRED EMBODIMENTS

Figure 1:
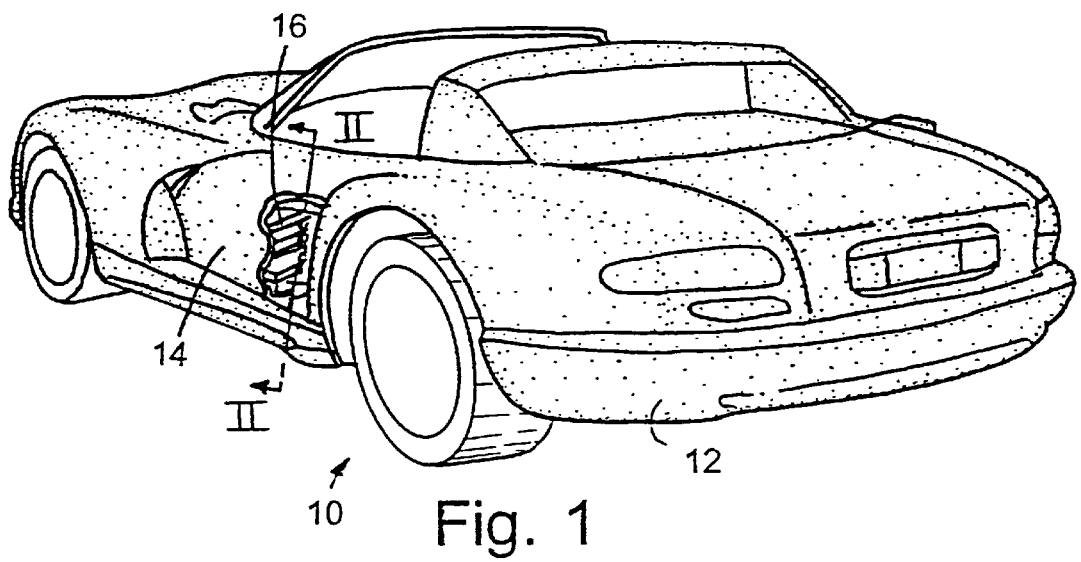
FIG. 1 is a perspective view of an automobile, with a portion of the side door outer panel broken away to reveal an extruded thermoplastic foam contained within the door.
Figure 2:
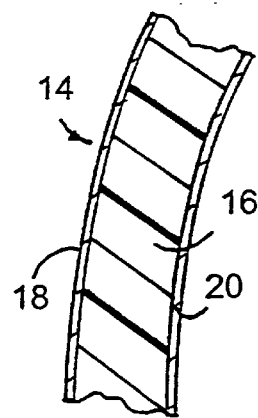
FIG. 2 is a sectional view along lines II—II of FIG. 1.

In FIG. 1 there is shown an automobile 10 having an impact absorbing rear EAU 12 and a side door 14 including an impact absorbing extruded thermoplastic foam insert 16 contained within a cavity of the door. As shown in more detail in FIG. 2, the thermoplastic foam insert 16 is located between an outer wall 18 and inner wall 20 of the side door 14. Thermoplastic foam insert 16 is an extruded thermoplastic foam exhibiting anisotropic strength characteristics. More specifically, foam insert 16 exhibits greater strength in one direction than in any other direction. Thermoplastic foam insert 16 is oriented within side door 14 so that the direction in which strength is greatest is approximately perpendicular to a vertical plane extending longitudinally to automobile 10, i.e., approximately perpendicular to the door wall panels 18, 20. The thermoplastic foam exhibiting anisotropic strength properties is therefore oriented so that the maximum strength direction is approximately aligned with the direction in which impact resistance is desired.

As shown in FIG. 3, rear EAU 12 includes an exposed face 22 which is approximately perpendicular to the direction in which high impact resistance is desired. EAU 12 includes a covering 24 of conventional design and contains one or more extruded thermoplastic foam inserts 26, 27, 28, each of which exhibits anisotropic strength properties wherein the strength in one direction is greater than in any other direction. Thermoplastic foam inserts 26, 27, and 28 are oriented so that the direction in which strength is greatest is approximately aligned with the longitudinal direction of the automobile, i.e., approximately perpendicular with the exposed face 22 of rear EAU 12. Alignment may also be perpendicular to the outer edge of covering 24.

Suitable foamable thermoplastic compositions include polyethylene, including low density polyethylene and high density polyethylene (HDPE), polypropylene, and co-polymers of ethylene or propylene and a monoethylenically unsaturated monomer copolymerizable therewith. Examples include copolymers of ethylene and acrylic acid or methylacrylic acid and $C_{1-4}$ alkyl esters or ionomeric derivatives thereof; ethylene vinyl-acetate copolymers; ethylene/carbon monoxide copolymers; anhydride containing olefin copolymers of a diene; copolymers of ethylene and an alpha-olefin having ultra low molecular weight (i.e., densities less than 0.92 g/cc); blends of all of the above resins; blends thereof with polyethylene (high, intermediate or low density); etc. Preferred polyolefins include polypropylene homopolymers and copolymers of polypropylene which are comprised of at least about 50% propylene by weight. Other suitable polyolefins include branched polypropylene homopolymer and branched copolymers of polypropylene.

The polymers of ethylene or propylene and a polar co-monomer may be prepared by known addition polymerization techniques, or by grafting reaction of the reactive co-monomer with a preformed polymer of ethylene or propylene. Additional elastomeric components such as polyisobutylene, polybutadiene, ethylene/propylene copolymers, and ethylene/propylene/diene interpolymers may be included in the blend if desired. Moreover, additional components such as cross linking agents designed to provide latent cross linking of the ethylenic or propylenic polymer, such as silane functional cross linking agents, or covalent or ionic cross linking agents, may be included if desired.

Other suitable foamable thermoplastic compositions which may be used in the practice of this invention include polyesters, polyamides, polyvinylchloride, polyvinylidene chloride, polycarbonates and polystyrene resins.

The thermoplastic polymer material or blend is melt processed in a conventional manner by feeding, melting, metering it into a conventional melt processing apparatus such as an extruder. A volatile blowing agent and an optional cross linking agent are mixed with the polyolefin polymer or blend under a pressure suitable to form a flowable gel or admixture. A cross linking agent may be added in an amount which is sufficient to initiate cross linking and raise the pressure of the gel or admixture to less than that pressure which causes melt fracture of the polymer to occur. The term "melt fracture" is used in the art to describe a melt flow instability of a polymer as it is extruded through a die, which flow instability causes voids and/or other irregularities in the final product.

It is also possible to add various additives such as inorganic fillers, pigments, anti-oxidants, acid scavengers, ultraviolet absorbers, flame retardants, surfactants, processing aids, extrusion aids and the like.

One additive which is not necessary, but is generally desirable in some circumstances is a nucleating agent as is generally known in the art. As a nucleating agent optionally used in this invention for controlling dispersion and size of cells, there can be referred to inorganic substances such as calcium carbonate, talc, clay, titanium oxide, silica, barium sulfate, diatomaceous earth and the like, carbon dioxide generated by the combination of a bicarbonate or a carbonate of sodium, potassium, ammonium or the like and an inorganic or organic acid such as boric acid, citric acid, tartaric acid or the like, thermal decomposition type chemical foaming agents such as azodicarbonamide, benzenesulfonyl hydrazide, toluenesulfonyl hydrazide and the like, etc. Among them, finally pulverized products or inorganic substances such as calcium carbonate, talc and the like are relatively preferred in that they have no restriction as to extrusion temperature.

The amount of nucleating agent may be appropriately selected from the range of 0.01–5 parts by weight per 100 parts by weight of the thermoplastic resin or blend. In this range, the most preferable amount is 0. 1–3 parts by weight. In generally, an increased amount of nucleating agent gives a smaller diameter of cell. However, if the amount exceeds 5 parts by weight, agglomeration or insufficient dispersion of nucleating substance occurs, so that the diameter of the cell becomes greater. On the contrary, if the amount is less than 0.01 parts by weight, the nucleating action is too feeble to decrease the diameter of the cells.

The volatile foaming agents usable in this invention generally have a boiling point temperature range of $-90°$ C. to $+80°$ C., and include, but are not limited to, aliphatic hydrocarbons such as n-pentane, isopentane, neo-pentane, isobutane, n-butane, propane, ethane and the like; fluorochlorinated hydrocarbons such as dichlorotetrafluoroethane, trifluoroethane, trichloromonofluoromethane, dichlorodifluoromethane, dichloromonofluoromathane and the like. Among them, the non-fully halogenated hydrocarbons are preferred on account of environmental considerations. Particularly preferred among the non-fully halogenated hydrocarbons are partially or fully fluorinated hydrocarbons and non-fully halogenated fluoro-chlorinated hydrocarbons. Examples of these include 1-chloro-1,1-fluoroethane, 1,1,1,2-tetra fluroethane and 1,1-difluoroethane. Other blowing agents which may be employed include HFC 152a, HCFC 142b, and HFC 134a. Particularly preferred among the aliphatic hydrocarbons is isobutane and isobutane/n-butane mixtures. Other blowing agents which my be employed include alcohols such as methanol and ethanol. Also contemplated are inorganic blowing agents such as carbon dioxide, water, nitrogen, argon and combinations thereof, as well as combinations of these inorganic blowing agents with hydrocarbon and/or halogenated hydrocarbon blowing agents. Also decomposable blowing agents, such as azobisformamide, may be incorporated with the volatile foaming agents. Mixtures of any or all of these volatile foaming agents are also contemplated within the scope of this invention. Also contemplated are combinations including water and/or carbon dioxide as the primary blowing agent.

From the view point of foaming workability and quality of foam product, the amount of foaming agent added to the thermoplastic resin or blend is preferably in the range of 0.012–0.14 gram mole by weight per 100 grams by weight of the thermoplastic resin or blend. Typically, the amount of foaming agent incorporated into the thermoplastic resin or blend depends on the desired foam density. In general, incorporation of a greater amount of foaming agent results in a higher expansion ratio (the term "expansion ratio" herein referred to means the ratio of the density of the resin or blend to the density of the expanded product) and thus a lower foam density.

However, care must be taken not to incorporate an amount of foaming agent that causes a separation between resin and foaming agent in the extruder. When this happens, "foaming in the die" occurs, and the surface of the expanded product becomes rough, generally producing an unsatisfactory product.

Other suitable methods of preparing and extruding foamable thermoplastic blends to produce extruded profiles which may be useful in preparing energy absorbing articles in accordance with the principles of this invention are disclosed in U.S. Pat. Nos. 5,348,795; 5,527,573 and 5,567,742, all of which are hereby incorporated herein by reference.

The thermoplastic foam blends are generally prepared by heating the thermoplastic resin or blend to form a plasticized or melt polymer material, incorporating therein a blowing agent to form a foamable gel, and extruding the gel through a die to form the foam product. Prior to mixing with the blowing agent, the thermoplastic resin or blend is heated to a temperature at or above its glass transition temperature or melting point. The blowing agent may be incorporated or mixed into the melt polymer material by any means known in the art, such as with an extruder, mixture, blender, or the like. The blowing agent is mixed with the melt polymer material at an elevated pressure sufficient to prevent substantial expansion of the melt polymer material and to generally disperse the blowing agent homogeneously therein. Optionally, a nucleating agent may be blended in the polymer melt or dry blended with the polymer material prior to plasticizing or melting. The foamable gel is typically cooled to a lower temperature to optimize physical characteristics of the foam structure. The gel may be cooled in the extruder or other mixing device or in separate coolers. The gel is then extruded or conveyed through a die of desired shape to a zone of reduced or lower pressure to form the foam product. The zone of lower pressure is at a pressure lower than that in which the foamable gel is maintained prior to extrusion through the die. The lower pressure may be super-atmospheric or sub-atmospheric (vacuum), but is preferably at an atmospherical level.

The thermoplastic foam may be open or closed-celled, as desired. The percentage of open cells can be controlled, as is well known in the art, by appropriate selection of blowing agents, additives, polymers, and processing parameters, such as temperatures, pressures, and extrusion rates.

In accordance with a particular aspect of this invention, the thermoplastic foams may be prepared by the extrusion foaming of a molten thermoplastic composition utilizing a die including a multiplicity of orifices. The orifices are so arranged such that the contact between adjacent streams of the molten extrudate occurs during the foaming process and the contacting surfaces adhere to one another with sufficient adhesion to result in a unitary structure. Desirably, the individual strands of coalesced foam should remain adhered into a unitary structure to prevent strain delamination under stresses encountered in preparing, shaping, and forming the foam product. U.S. Pat. No. 4,824,720, which describes the coalesced (or stranded) foam process, is hereby incorporated by reference. This patent describes a method for providing a closed cell foam structure comprising a plurality of coalesced extruded strands or profiles by extrusion forming of a molten thermoplastic composition utilizing a die including a multiplicity of orifices. The coalesced strand foam may be a coextrudate comprising strands of two or more different densities. Coextrusion methods and methods of varying the densities of thermoplastic foams are well known in the art and will not be described in detail herein. In addition to coextrudates comprising coalesced strand foams having foam strands of two or more different densities, the extruded thermoplastic foams exhibiting anisotropic strength properties which may be utilized in accordance with the principles of this invention include coextrudates including foam strands and a unitary (integral piece) interleaving profile of an unfoamed thermoplastic.

In accordance with a particular aspect of this invention, energy absorbing articles exhibiting anisotropic strength properties are prepared by extruding a foamable thermoplastic gel through a die including a plurality of orifices arranged such that contact between adjacent streams of molten extrudate causes the surfaces thereof to adhere to form a unitary coalesced foam article, wherein the polymeric component of the foamable gel comprises a polymer blend including a major amount (greater than 50% by weight) of a homopolymer or copolymer in which the majority of monomeric units are propylene monomeric units and a minor amount (less than 50% by weight) of a polyethylene type resin modifier in which the majority of monomeric units are ethylene monomeric units. It has been discovered that the resulting coalesced strand foams produced from such polymeric blends unexpectedly exhibit increased tensile strength, especially in directions normal to the longitudinal direction of the coalesced strands (i.e., the extrusion direction), relative to coalesced strand foams made from polypropylene homopolymer or from a blend of polypropylene homopolymer and an ethylene-propylene copolymer resin modifier. The increased tensile strength, especially in directions normal to the longitudinal direction of the coalesced strands, is attributable to improved strand-to-strand adhesion caused by the addition of a minor amount of a polyethylene type resin modifier which is a homopolymer or copolymer comprised entirely or mostly of ethylene monomeric units. The polyethylene type resin modifiers will typically have a melting point lower than that of the polypropylene homopolymer or copolymer, and preferably have a melting point below about 125° C. The polyethylene type resin modifiers are comprised primarily of ethylene monomeric units, and more preferably are comprised of at least 80% ethylene monomeric units by weight.

Examples of preferred polyethylene type resin modifiers include low density polyethylene homopolymers and substantially linear ethylenic polymers having a melt flow ratio, $I_{10}/I_2$, greater than or equal to about 5.63, a molecular weight distribution, $M_W/M_N$, defined by the equation $M_W/M_N \leq (I_{10}/I_2)-4.63$, and a critical shear rate at onset of surface melt fracture of at least 50% greater than the critical shear rate at the onset of surface melt fracture of a linear olefin polymer having about the same $I_2$ and $M_W/M_N$. Substantially linear ethylenic polymers as set forth above are described in U.S. Pat. Nos. 5,340,840 and 5,272,236, which are hereby incorporated by reference. Other preferred polyethylene type resin modifiers are homogeneously branched substantially linear ethylene/α-olefin interpolymers having a density from about 0.89 g/cc to about 0.92 g/cc, a molecular weight distribution ($M_W/M_N$) from about 1.8 to about 2.8, a melt index ($I_2$) from about 0.001 grams/10 minutes to about 10 grams/10 minutes, no high density fraction, a single melting peak as measured using differential scanning colorimetry, a critical shear stress at onset of gross melt fracture greater than $4 \times 10^6$ dynes/cm$^2$, and a slope of strain hardening coefficient from 1.3 to 2.3 (description of Enhanced PE). These homogeneously branched substantially linear ethylene/α-olefin interpolymers are described in U.S. Pat. No. 5,677,383 which is incorporated by reference herein. Other suitable ethylene type resin modifiers which may be used in a minor amount in combination with a propylene polymer in a major amount and extruded through a die having a multiplicity of orifices to form coalesced strand foams exhibiting enhanced strand-to-strand adhesion and improved tensile strength and modulus, especially in directions normal to the longitudinal direction of the coalesced strands, include medium density polyethylene (MDPE), high density polyethylenes (HDPE) (for example, those made using Ziegler catalysts as in U.S. Pat. No. 4,076,698), ethylene/ester copolymers, ethylene/vinyl acetate copolymers, copolymers of ethylene and ethylenically unsaturated carboxylic acids, homopolymers and copolymers of alpha-ethylentics, etc. Examples of commercially available polyethylene type resins which can be blended in a minor amount with a major amount of a polypropylene homopolymer or copolymer and extruded through a die having a multiplicity of orifices to form coalesced strand foams exhibiting improved strand-to-strand adhesion and improved tensile strength in a direction normal to the longitudinal direction of the coalesced strands include substantially linear ethylenic polymers sold by Dow Chemical Company under the mark "Affinity" and low density polyethylene sold by Dow under the mark "Elite". The polyethylene type resin modifiers when blended in a minor amount with a major amount of a propylene homopolymer or copolymer, combined with a blowing agent and other additives to form a foamable gel, and extruded through a die having a multiplicity of orifices, provide coalesced strand foams exhibiting significant improvement in tensile strength in a direction normal to the longitudinal direction of the coalesced strands as compared with a coalesced strand foam comprised of a polymeric blend including polypropylene homopolymer and an ethylene/propylene copolymer resin modifier which is comprised of about 20% ethylene monomeric units.

The coalesced strand foam energy absorbing articles of this invention may include missing strands or designed voids, i.e., a profile or cross section transverse to the extrusion direction which is discontinuous. Coalesced strand foam articles having missing strands or designed voids can be prepared by extruding a thermoplastic foamable gel through a die having a multiplicity of orifices arranged in an array defining voids such that the extruded strands are joined at their extremities to form a network defining voids. A die having a multiplicity of orifices which is designed to produce coalesced strand foams which do not have missing strands or designed voids can be modified to produce coalesced strand foams having missing strands or designed voids by blocking off some of the orifices. Energy absorbing articles having designed voids may be advantageously employed in certain applications to allow manipulation of bulk density and softness (modulus control), and increase air flow. Also, the designed voids may be used for creating raceways for wires, optical fibers, and the like. Methods of forming stranded foam articles having designed voids are described in U.S. Pat. No. 4,801,484 which is incorporated by reference herein.

The extruded thermoplastic foams exhibiting anisotropic strength property may also be prepared as extruded planks. Extruded thermoplastic foam planks may be pulled through a slit die at generally any rate of speed commonly used, and can be stretched or pulled from the die by any means known in the art, such as by pulling with opposing belts, nip rollers and like take-up means.

Although a particularly preferred method of preparing the energy absorbing articles exhibiting anisotropic strength properties involves extruding a foamable thermoplastic gel through a die including a multiplicity of orifices arranged such that contact between adjacent streams of molten extrudate causes the surfaces thereof to adhere and form a unitary coalesced foam article, other methods may be employed to form thermoplastic foam articles exhibiting similar or equivalent anisotropic strength properties.

An alternative method of forming foam articles exhibiting anisotropic strength properties is to extrude a thermoplastic foamable gel through a die having a desired profile (e.g., a rectangular profile), providing the extruded profile with a plurality of spaced apart (e.g., parallel) cuts, and subsequently thermally fusing the cut surfaces to reintegrate the extruded profile into a thermoplastic foam article 40 (FIG. 5) having a plurality of relatively thin, spaced apart thermoplastic non-foamed layers 42 having a higher density than the relatively thicker, lower density foam layers 44 interposed between the non-foamed layers. A suitable technique for cutting and fusing the cut surfaces of an extruded profile to form a thermoplastic article having a layered or laminated structure comprising alternating relatively thick foam layers and relatively thin non-foamed layers is to pass a thermoplastic foam profile through a tool having a plurality of spaced apart hot wires which cut through the profile and allow the freshly cut surfaces to readhere or fuse together, preferably immediately down stream of the hot wires. As the hot wires pass through the extruded profile, the thermoplastic foam softens or melts, collapsing the cellular foam structure in the immediate vicinity of the hot wire, and subsequently resolidifies to form a relatively thin, relatively high density non-foamed layer. The resulting layered or laminated structure exhibits anisotropic strength properties. In particular, the resulting layered structure exhibits greater strength in a direction aligned with the planes in which the non-foamed layers are arranged than in a direction perpendicular to the planes in which the non-foamed layers are arranged.

A honeycomb-like composite structure 50 (FIG. 6) can be prepared by providing an extruded profile with a first set of spaced apart (e.g., parallel) cuts, and a second set of spaced apart (e.g., parallel) cuts which are arranged at an angle (e.g., perpendicular) with respect to the first set of cuts, and subsequently thermally fusing the cut surfaces together. This can be achieved by passing the extruded profile through a tool having spaced apart hot wires arranged in an array, such as with a first set of spaced apart hot wires arranged parallel to each other and a second set of spaced apart hot wires arranged parallel to each other and at an angle (such as perpendicular) to the first set of hot wires. As the hot wires pass through the extruded profile, the thermoplastic foam softens or melts, collapsing the cellular foam structure in the immediate vicinity of the hot wires, and subsequently resolidifies to form a network or array of relatively thin, relatively high density intersecting non-foamed layers 52 which form a honeycomb-like structure with the spaces defined by the boundaries of the intersecting walls being occupied by a relatively low density thermoplastic foam 54. The resulting honeycomb-like composite structure exhibits anisotropic strength properties. In particular, the honeycomb-like composite structure exhibits greater strength in a directional aligned with the planes of the intersecting non-foamed layers than in a direction perpendicular to the intersecting non-foamed layers. The first set of spaced apart hot wires and the second set of spaced apart hot wires can be arranged in a single tool, or in two different tools through which the extruded profile is advanced. Alternatively, a single tool having only one set of spaced apart hot wires can be used for forming the honeycomb-like composite structure, such as by advancing an extruded profile through the tool to form a first set of spaced apart films, rotating the resulting layered structure having alternating relatively thick foam layers and relatively thin non-foamed layers (such as 90°), and passing the layered structure through the same tool a second time, at a different angle with respect to the hot wires, to form a honeycomb-like composite structure.

As another alternative, the method of forming energy absorbing articles exhibiting anisotropic strength properties by providing the extruded profile with a plurality of spaced apart cuts and subsequently thermally fusing the cut surfaces together to reintegrate the extruded profile into a thermoplastic foam article having a layered or honeycomb-like composite structure can be achieved by cutting the extruded profile with saws or blades, applying heat to the cut surfaces to soften or melt thermoplastic foam in the immediate vicinity of the cut surfaces to collapse the cellular foam structure, and immediately thereafter contacting the cut surfaces with each other to thermally fuse the surfaces together and form an integrated layered or honeycomb-like composite structure. The layered and honeycomb-like composite structures exhibiting anisotropic strength properties need not necessarily be prepared by reintegrating cut surfaces of an extruded foam profile, but may instead be prepared by thermally fusing surfaces (either cut surfaces or extrudate surfaces) of a plurality of thermoplastic foam pieces to form an integrated, unitary composite structure. As yet another alternative, thermoplastic foam pieces can be bonded together at their surfaces by applying a molten thermoplastic film, sheet or layer to surfaces of thermoplastic foam profiles and immediately thereafter joining the surfaces to form an integrated, unitary structure having alternating spaced apart thin non-foamed layers and relatively thick foam layers, or intersecting non-foamed layers which form a honeycomb-like structure. As yet another alternative, an adhesive, such as a thermosetting adhesive, may be utilized in place of the molten thermoplastic to join surfaces of an array of thermoplastic foam profiles to form the layered or honeycomb-like composite structures exhibit anisotropic strength properties. The molten thermoplastic materials and/or adhesives used for adhering surfaces of thermoplastic foam profiles to form an integrated, unitary energy absorbing article exhibiting anisotropic strength properties should exhibit good adhesive properties with the thermoplastic foam and should solidify to form films having strength properties superior to that of the thermoplastic foam.

Figure 7:
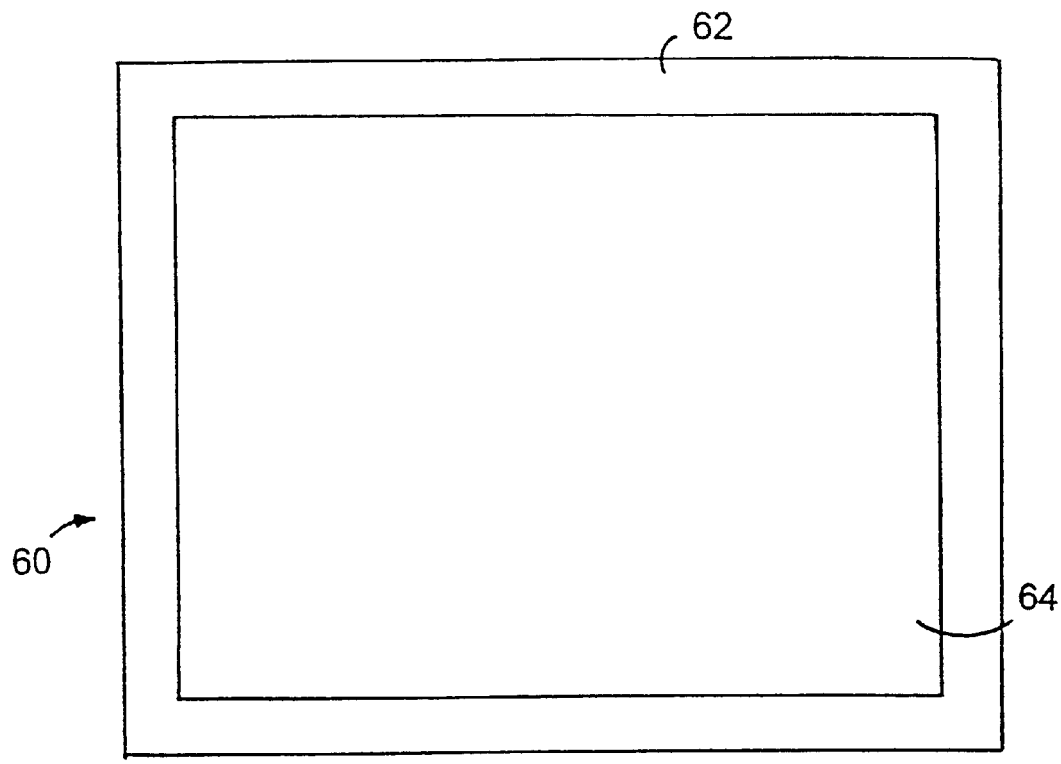
FIG. 7 is a transverse cross section of a thermoplastic foam composite including a foam core and a higher density skin which acts as a monocoque-like reinforcement structure.

Another method for making energy absorbing articles exhibiting enhancing or augmented anisotropic strength properties involves melting outer surfaces of a thermoplastic foam profile, or any of the previously described embodiments, and thermoforming the outer melted surfaces to provide a composite 60 (FIG. 7) including a relatively higher density skin 62 which acts as a monocoque-like reinforcement structure for the foam core 64. For example, the lateral surfaces of a foam profile having isotropic strength properties, or any of the previously described embodiments of the invention, may be melted and thermoformed to form a continuous skin 62 circumscribing the foam profile or energy absorbing article. The resulting structure has enhanced strength characteristics in a direction aligned with the circumscribing tubular skin. A similar monocoque-like structural reinforcement can be provided by laminating a separate structural skin to the outer surfaces of a thermoplastic foam profile, or any of the previously described embodiments of the invention. The separate structural skin may be comprised of a polymer which is either the same or different from the polymer of which the thermoplastic foam is comprised.

The anisotropic strength properties of any of the previously described embodiments of the invention may be further enhanced or augmented by incorporation of continuous and/or discontinuous reinforcing fibers which may be oriented length wise in a direction in which high impact resistance is desired. Suitable reinforcing fibers include synthetic fibers, such as aramid, polyester, and polyolefin fibers; natural fibers, such as sisal; ceramic fibers; glass fibers; metallic fibers; and the like.

The physical properties and thermal resistance of the foam may be enhanced by adding particles or fibers of organic or inorganic materials in the form of fillers. Such particulates or fibers could be added to foam-forming compositions during manufacturing. Useful materials include carbon black particulates, clay particulates, carbon or graphite fibers, polypropylene fibers, polyester fibers, and nylon fibers, glass fibers, liquid crystal fibers and the like. The physical properties and thermal resistance of the foam may also be enhanced by laminating to the foam non-foamed film/sheet layers or coatings containing such particles or fibers. Fibers may be of any length, short (fibrils) or long. They may be randomly dispersed or woven or placed together in the nature of a woven or non-woven fabric or prepreg.

Adhesives known in the art may be employed to adhere various layers, such as decorative and/or functional fabrics, to any of the energy absorbing articles described herein. Useful adhesives include thermoset adhesives such as polyurethane resins and epoxies and thermoplastic adhesives such as polyethylenes, polypropylenes, ethylene copolymers; propylene copolymers; and the like. Useful adhesives are taught in U.S. Pat. Nos. 5,460,870 and 5,670,211. The adhesive may be applied by any means known in the art such as by spraying, coating, or in film form. Preferred adhesives are thermoplastic because of their lower cost and potential recyclability. The presence of an adhesive is not critical to the present invention.

Figure 8:
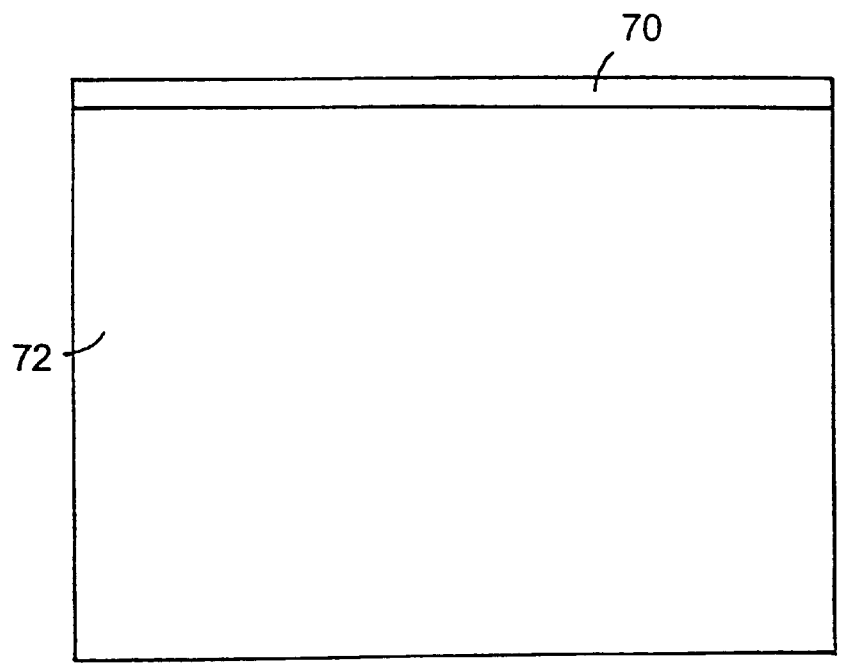
FIG. 8 is a transverse cross section of a thermoplastic foam article having a decorative layer attached thereto.

A layer or layers of decorative material 70 (FIG. 8), such as felt or fabric, may be applied to the energy absorbing articles 72 of this invention for aesthetic purposes. The layer may be of any type known in the art. Examples include felts, or woven fabrics. Useful fabrics include those of woven polyester, nylon and polypropylene fibers. Preferably, the felt or fabric layer is comprised of the same or similar polymeric material as the foam. The felt or fabric layer may be adhered to the foam by any means known in the art such as thermal welding, adhesive films, or adhesive liquids or coatings. For example, a decorative layer comprised of a woven fabric of thermoplastic fibers may be thermally welded to the energy absorbing articles of this invention without the benefit of adhesives. Thermal welding refers to heating of the fabric layer to an extent such that the fibers become tacky or sticky and are able to adhere to the energy absorbing article without the benefit of an adhesive. Alternatively, the energy absorbing article may be heated until the surface becomes tacky or sticky and is able to adhere to the fabric layer, or other intermediate layer. A fabric layer may be thermally welded to the surface of an energy absorbing article if applied during thermoforming.

We have discovered that the extruded thermoplastic foam products of this invention exhibit anisotropic strength properties. More specifically, we have determined that the strength in the extrusion direction is greater than the strength in directions perpendicular to the extrusion direction. Strength properties as used herein include, but are not necessarily limited to, compressive strength, compressive modulus, and impact resistance. For example, depending upon the various parameters, materials and apparatus used during the extrusion, compressive strength in the extrusion direction may be 25%, 50%, 100%, or even 200% or more greater than in a direction perpendicular to the extrusion direction. For example, stranded or coalesced polypropylene extrudates have exhibited compressive strength in the extruded direction which is more than four times that in a direction perpendicular to the extrusion direction. Accordingly, the energy absorbing articles of this invention are formed of extruded thermoplastic foam exhibiting the above noted anisotropic compressive strength properties, with the direction of maximum strength of the extruded thermoplastic foam being approximately aligned with the direction in which impact is expected and impact resistance is desired. In particular, the direction of maximum strength of the thermoplastic foam extrudate and the direction in which impact resistance is desired in the energy absorbing article should differ by an angle of less than about 45°, more preferably less than 10°, and most preferably less than 5°. Approximate alignment of the direction of maximum strength of the thermoplastic foam with the direction in which impact is expected or occurs or in which impact resistance is desired means that the direction of maximum strength of the extrudate is more nearly parallel to the direction in which impact resistance is desired than perpendicular to the direction in which impact resistance is desired. A 180° rotation of the extrudate about an axis perpendicular to the direction of maximum strength and with respect to a first orientation is generally equivalent to that first orientation.

Desirably, the materials, i.e., the thermoplastic resin or blend, nucleating agents, foaming agents, and process parameters, e.g., temperatures and extrusion rate, are selected so that the foamed extrudate has a density of less than 20 pounds per cubic foot, preferably from about 2 to 12 pounds per cubic foot, more preferably 2.5 to 10 pounds per cubic foot, and most preferably from about 3 to 8 pounds per cubic foot. The resulting extrudates exhibit anisotropic compressive strength properties, with the highest compressive strengths generally being observed in the extrusion direction. The extrudates typically have a compressive strength in the extrusion direction of at least about 25 psi (pounds per square inch) at about 25% strain, more preferably at least about 45 psi at 25% strain, and most preferably at least about 75 psi at 25% strain as measured in accordance with ASTM D3575-93 (Suffix D).

The extruded thermoplastic foam products in accordance with this invention can be foamed or formed into the desired shape of the energy absorbing article, such as an automobile EAU, in which it is used, or the extruded thermoplastic foam may be cut and shaped into the desired shape of the energy absorbing article. Alternatively, the energy absorbing article may be comprised of a plurality of components which are joined, such as by hot air welding, steam welding, radio frequency welding, adhesives, mechanical fasteners, or the like, to form a composite energy absorbing article. In this manner, energy absorbing articles having unusual shapes, or containing portions of various density may be prepared. Also, composite articles containing materials other than the extruded thermoplastic foam may be prepared. Another alternative method of utilizing the extruded thermoplastic foams of this invention in composite energy absorbing articles is to use the extruded thermoplastic foams as inserts in a closed mold in which a suitable matrix resin is dispersed.

The polymeric foam energy absorbing articles of this invention which exhibit anisotropic strength properties have broad applicability in transportation, shipping containers, building and construction, as well as automotive application. Automotive applications include energy absorbing structures for front and rear end systems, doors, seats, and instrument panel components. Load bearing applications include floor pans, belly pans, seat components, hard top convertible roofs, lift gates, and pickup tailgates and boxes.

The methods disclosed herein can be used for forming various articles having general utility in various cushioning application such as casings, packaging and the like. In addition to forming EAUs, the methods of this invention can be employed to prepare various other energy absorbing automotive components such as headliners, pillar trim reinforcements, instrument panel reinforcements, seat cushions and seating systems, and tailgates.

EXAMPLE 1

Figure 4:
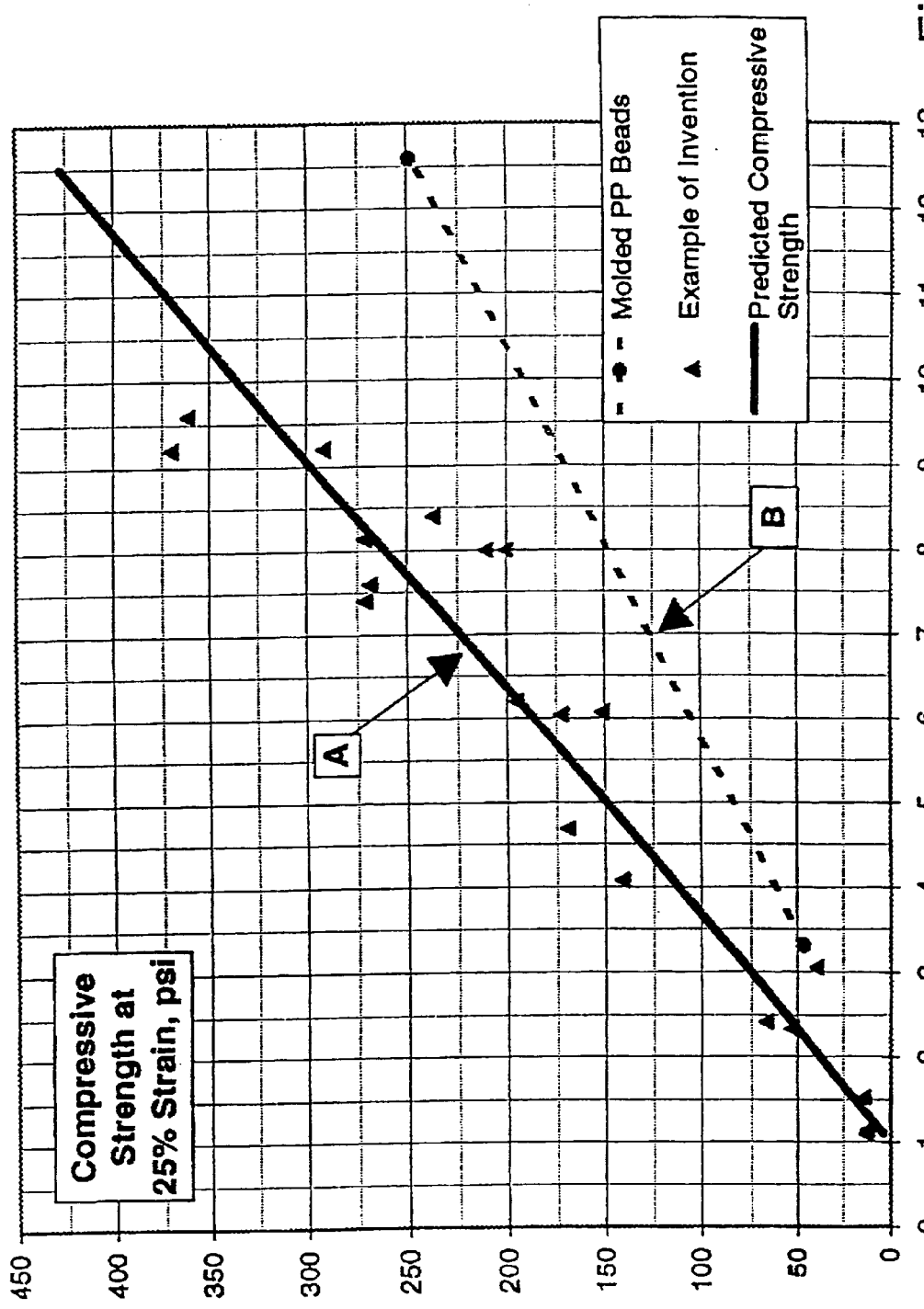
FIG. 4 is a graph of compressive strength at 25% strain (psi) as a function of density (pounds per cubic foot), comparing the compressive strength of an extruded polyolefin foam in accordance with the invention to the compressive strength of a conventional molded article prepared by dispersing expandable beads of a polypropylene resin in a closed vessel and heating beads at a temperature at which the beads expand and soften and melt-adhere to each other into a mass.

A polypropylene homopolymer was extruded through a die having a multiplicity of orifices to produce a coalesced or stranded polypropylene foam extrudate. By appropriately varying process parameters, coalesced strand polypropylene extrudates at varying densities were prepared. For purposes of comparison, commercially available polypropylene particles were fed into a mold capable of enclosing the particles but allowing escape of gases therefrom, and heated to form foamed molded articles at various densities. The foamed extrudates exhibited anisotropic compressive strength properties, whereas the molded polypropylene foamed articles exhibited isotropic compressive strength properties. In FIG. 4, the compressive strength of the foamed extrudate in the extrusion direction at 25% strain is plotted as a function of density, and compared with the compressive strength at 25% strain of the molded foamed article as a function of density. FIG. 4 clearly demonstrates that the extruded polyolefin foam products of this invention (curve A) exhibit substantially higher compressive strengths than the conventional molded polyolefin foam products (curve B).

EXAMPLE 2

This example involves the preparation and testing of various coalesced strand foams in which the polymeric component is comprised of a blend including a major amount of a propylene homopolymer and a minor amount of a polyethylene type resin modifier in accordance with the principles of an aspect of this invention. The tests demonstrate that the polyethylene type resin modifiers provide significant improvements in tensile strength in a direction normal to the longitudinal direction of the coalesced strands.

For purposes of comparison, a coalesced strand foam was prepared using a polymeric blend comprising 88 parts by weight of a propylene homopolymer and 12 parts by weight of an ethylene/propylene (E/P) copolymer. Using an extruder, 12 parts of an ethylene/propylene copolymer (KS351P), 88 parts of a propylene homopolymer (6823), 0.1 parts each of Irganox 1010 and Ultranox 626 (heat stabilizers), 0.4 parts talc, and 0.2 parts calcium stearate were blended. The blend exited the extruder at 185° C.–200° C. prior to being mixed with 16 parts of isobutane blowing agent either in a mixing extruder section or other equipment to mix liquid blowing agent with molten polymer. The mixture was then cooled to 160° C. prior to being extruded through the die. At the die, the mixture was extruded through a multiplicity of orifices to produce a coalesced strand foam. After allowing the foam to cure at room temperature for one week, tensile tests sample were cut from the foam pieces to allow the foam strand-to-strand adhesion to be measured. The horizontal tensile tests was done in accordance with standard ASTM testing methods.

Six working examples in accordance with the principles of this invention were also prepared and tested in a substantially identical manner, except that the E/P copolymer was replaced with 12 parts of each of six different polyethylene type resin modifiers in accordance with the principles of this invention. The results are set forth below in Table I.

| Resin Used | Resin Properties | | Tensile Strength (psi) | Tensile Modulus (psi) |
|---|---|---|---|---|
| KS351P | E/P Copolymer | 0.4 MI | 6.5 | 137 |
| DPF-1340 | Enhanced PE | 3.0 MI .909 g/cc | 8.8 | 82 |
| DPF-1340 | Enhanced PE | 3.0 MI .909 g/cc | 11.4 | 144 |
| LDPE 6201 | LDPE | 1.8 MI .920 g/cc | 8.1 | 116 |
| PL1280 | AFFINITY PE | 6.0 MI .900 g/cc | 9.3 | 138 |
| PL1880 | AFFINITY PE | 1.0 MI .902 g/cc | 10.4 | 167.5 |
| EG8150 | AFFINITY PE | 0.5 M1 .868 g/cc | 11.0 | 142 |

All of the coalesced strand foams containing the polyethylene type resin modifiers of the invention exhibited improved strand-to-strand adhesion (as exemplified by the significant improvement in tensile strength as measured in a direction normal to the longitudinal direction of the coalesced strands) as compared with a coalesced strand foam prepared from a polymeric blend of propylene homopolymer and ethylene/propylene copolymer.

The embodiments of the invention in which an exclusive property or privilege is claimed are defined as follows:

1. A method of absorbing impact, comprising:
   providing an extruded thermoplastic foam having greater compressive strength in a first direction than in any other direction; and
   impacting the extruded thermoplastic foam in a direction which is approximately aligned with the first direction in which compressive strength is greatest the foam being a coalesced strand foam.

2. The method of claim 1, wherein the extruded thermoplastic foam is a coextruded coalesced strand foam with strands of two or more different densities.

3. The method of claim 1, wherein the extruded thermoplastic foam is a coextrudate including foam strands and a unitary interleaving profile of an unfoamed thermoplastic.

4. The method of claim 1, wherein the extruded thermoplastic foam comprises a polyolefin.

5. The method of claim 4, wherein the polyolefin consists primarily of a polypropylene homopolymer, or a copolymer of propylene which propylene repeat units comprise at least 50% of the copolymer by weight.

6. The method of claim 1, wherein the extruded thermoplastic foam is comprised of a polymeric blend including a major amount of a homopolymer or copolymer in which the majority of monomeric units are propylene monomeric units and a minor amount of a polyethylene type resin modifier in which a majority of monomeric units are ethylene monomeric units.

7. The method of claim 6, wherein the polyethylene type resin modifier has a melting point below about 125° C.

8. The method of claim 7, wherein the polyethylene type resin modifier 6 comprised of at least 80% ethylene monomeric units by weight.

9. The method of claim 8, wherein the polyethylene type resin modifier is a low density polyethylene homopolymer.

10. The method of claim 8, wherein the polyethylene type resin modifier is a substantially linear ethylenic polymer having a melt flow ratio ($I_{10}/I_2$) greater than or equal to about 5.63, a molecular weight distribution defined by the equation $M_W/M_N \leq (I_{10}I_2)-4.63$, and a critical shear rate at onset of surface melt fracture of at least 50% greater than the critical shear rate at the onset of surface melt fracture of a linear olefin polymer having about the same $I_2$ and $M_W/M_N$.

11. The method of claim 8, wherein the polyethylene type resin modifier is a homogeneously branched substantially linear ethylene/α-olefin interpolymer having a density from about 0.89 g/cc to about 0.92 g/cc, a molecular weight distribution ($M_W/M_N$) from about 1.8 to about 2.8, a melt index ($I_2$) from about 0.001 grams per 10 minutes to about 10 grams per 10 minutes, no high density fraction, a single melting peak as measured using differential scanning colorimetry, a critical shear stress at onset of gross melt factor greater than $4 \times 10^6$ dynes/cm$^2$, and a slope of strain hardening coefficient from 1.3 to 2.3.

12. The method of claim 1, wherein the extruded thermoplastic foam includes designed voids.

13. The method of claim 1, wherein the extruded thermoplastic foam has a layered structure comprising alternating relatively thick foam layers and relatively thin non-foamed layers.

14. The method of claim 1, wherein the extruded thermoplastic foam includes a network of relatively thin, relatively high density intersecting non-foamed layers which form a honeycomb-like structure, with spaces defined by the intersecting walls being occupied by relatively low density thermoplastic foam.

15. The method of claim 1, wherein the extruded thermoplastic foam has thermoformed outer surfaces which act as a monocoque-like reinforcement structure.

16. The method of claim 1, wherein the extruded thermoplastic foam includes reinforcing fibers.

17. The method of claim 16, wherein the reinforcing fibers are oriented lengthwise in a direction in which high impact resistance is desired.

18. The method of claim 1, wherein the extruded thermoplastic foam further comprises particulate materials in the form of fillers.

19. The method of claim 1, wherein the extruded thermoplastic foam further comprises a layer of decorative material.

20. The method of claim 1, wherein the compressive strength of the extruded thermoplastic foam in the extrusion direction is at least 25% greater than in any direction perpendicular to the extrusion direction.

21. The method of claim 1, wherein the compressive strength of the extruded thermoplastic foam in the extrusion direction is at least 50% greater than in a direction perpendicular to the extrusion direction.

22. The method of claim 1, wherein the compressive strength of the extruded thermoplastic foam in the extrusion direction is at least 100% greater than in a direction perpendicular to the extrusion direction.

23. The method of claim 1, wherein the density of the extruded thermoplastic foam is at least 2 pounds per cubic foot.

24. The method of claim 1, wherein the density of the extruded thermoplastic foam is at least 2.5 pounds per cubic foot.

25. The method of claim 1, wherein the density of the extruded thermoplastic foam is at least about 3 pounds per cubic foot.

26. The method of claim 1, wherein the density of the extruded thermoplastic foam is less than 20 pounds per cubic foot.

27. The method of claim 1, wherein the extruded thermoplastic foam is oriented so that the direction in which the strength is greatest for the extruded thermoplastic foam differs from the direction in which the extruded thermoplastic foam is impacted by an angle of less than about 45°.

28. The method of claim 1, wherein the extruded thermoplastic foam is oriented so that the direction in which the strength is greatest for the extruded thermoplastic foam differs from the direction in which the extruded thermoplastic foam is impacted by an angle of less than about 10°.

29. The method of claim 1, wherein the extruded thermoplastic foam is oriented so that the direction in which the strength is greatest for the extruded thermoplastic foam differs from the direction in which the extruded thermoplastic foam is impacted by an angle of less than about 5°.

30. The method of claim 1, wherein the compressive strength of the extruded thermoplastic foam in the direction in which strength is greatest is at least about 25 pounds per square inch at 25% strain.

31. The method of claim 1, wherein the compressive strength of the extruded thermoplastic foam in the direction in which strength is greatest is at least about 45 pounds per square inch at 25% strain.

32. The method of claim 1, wherein the compressive strength of the extruded thermoplastic foam in the direction in which strength is greatest is at least about 75 pounds per square inch at 25% strain.

33. A method of absorbing impact, comprising:

obtaining an extruded thermoplastic foam having greater strength in a first direction than in any other direction; and incorporating the extruded thermoplastic foam into an energy absorbing article having a surface intended to absorb impact, the extruded thermoplastic foam being arranged in the article so that the first direction in which strength is greatest is approximately perpendicular to the surface intended to absorb impact.

34. An energy absorbing article, comprising:

a surface in which impact resistance is desired;

an extruded thermoplastic foam incorporated into the energy absorbing article, the extruded thermoplastic foam being a coalesced strand foam and having greater strength in a first direction than in any other direction; and the extruded thermoplastic foam being oriented so that the first direction in which strength is greatest is approximately aligned with the direction in which impact resistance is desired.

35. An automobile including an impact absorbing member exhibiting high impact resistance in a desired direction, said impact absorbing member comprising an extruded thermoplastic foam having greater strength in a first direction than in any other direction, the extruded thermoplastic foam being oriented so that the first direction in which strength is greatest is approximately aligned with the direction in which impact resistance is desired.

* * * * *